(12) United States Patent
Root

(10) Patent No.: US 6,964,456 B2
(45) Date of Patent: Nov. 15, 2005

(54) BRAKE SYSTEM CUT-OUT CONTROL

(75) Inventor: Kevin B. Root, Black River, NY (US)

(73) Assignee: New York Air Brake Corporation, Watertown, NY (US)

( * ) Notice: Subject to any disclaimer, the term of this patent is extended or adjusted under 35 U.S.C. 154(b) by 12 days.

(21) Appl. No.: 10/388,533

(22) Filed: Mar. 17, 2003

(65) Prior Publication Data

US 2004/0183362 A1    Sep. 23, 2004

(51) Int. Cl.$^7$ ............................................... B16T 7/00
(52) U.S. Cl. ............................................. 303/15; 303/3
(58) Field of Search ............................. 303/3, 15, 20, 303/85

(56) References Cited

U.S. PATENT DOCUMENTS

| | | | |
|---|---|---|---|
| 5,222,788 A * | 6/1993 | Dimsa et al. ................. | 303/15 |
| 5,511,749 A | 4/1996 | Horst et al. | |
| 5,685,507 A | 11/1997 | Horst et al. | |
| 6,036,284 A | 3/2000 | Pettit et al. | |
| 6,234,588 B1 * | 5/2001 | Sawada ................... | 303/119.1 |
| 6,449,536 B1 | 9/2002 | Brousseau et al. | |
| 6,456,674 B1 | 9/2002 | Horst et al. | |
| 6,470,245 B1 | 10/2002 | Proulx | |

* cited by examiner

Primary Examiner—Xuan Lan Nguyen
(74) Attorney, Agent, or Firm—Barnes & Thornburg LLP

(57) ABSTRACT

The present locomotive brake system has at least one of a train brake pipe controller connected to a train brake pipe by a cut-out device, locomotive brake pipe controller connected to a locomotive brake pipe by a cut-out device, and a release pipe controller connected to a release pipe by a cut-out device. The cut-out device includes a pneumatic controller cut-out having an input connected to a respective controller and an output connected to a respective pipe and being responsive to pressure at the input to connect or disconnect the respective controller and the respective pipe. A system cut-out device selectively connecting a pressure source or atmosphere to the controller to assure the controller cut-out disconnects.

19 Claims, 7 Drawing Sheets

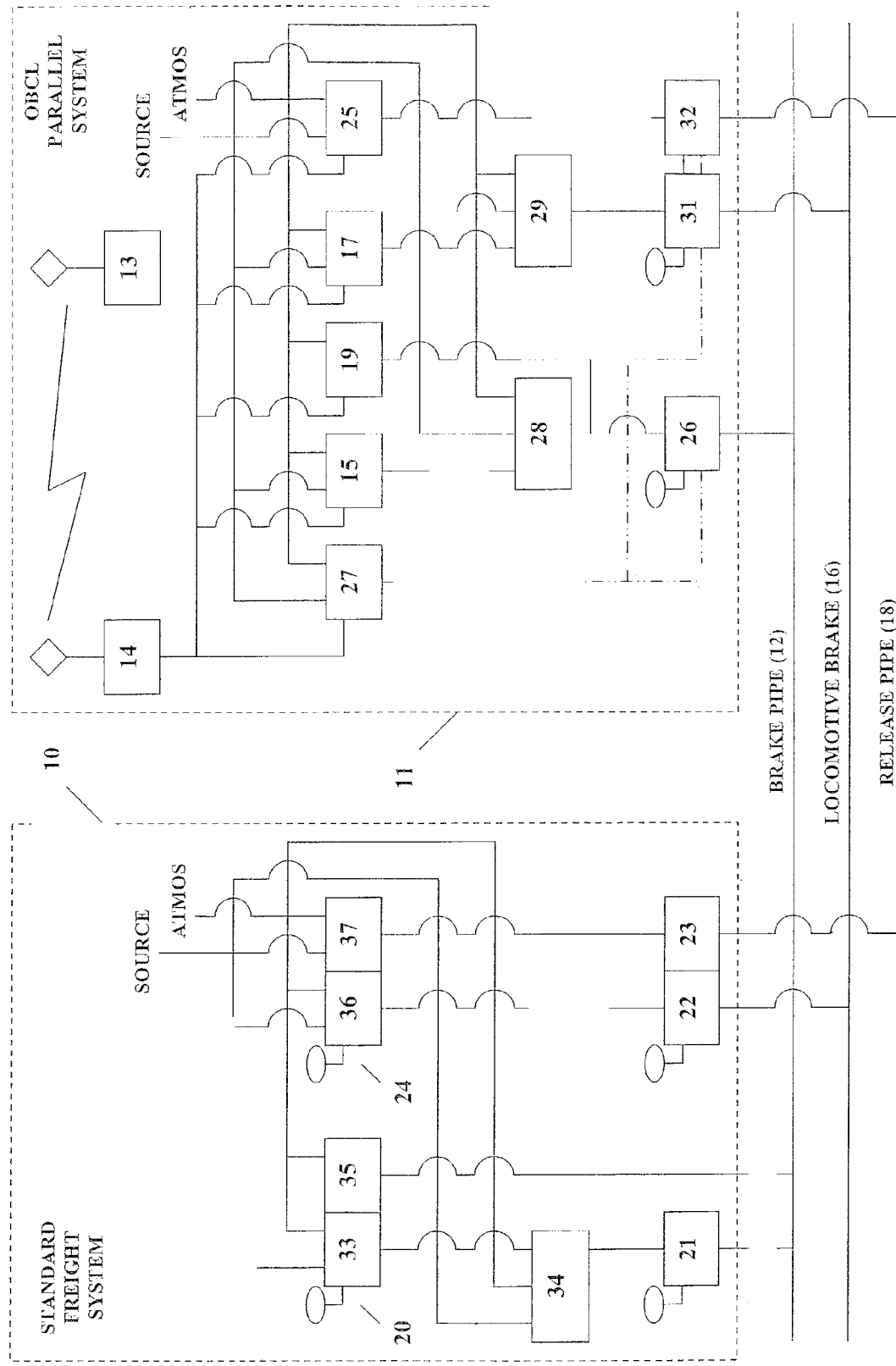
FIG. 1A – PRIOR ART

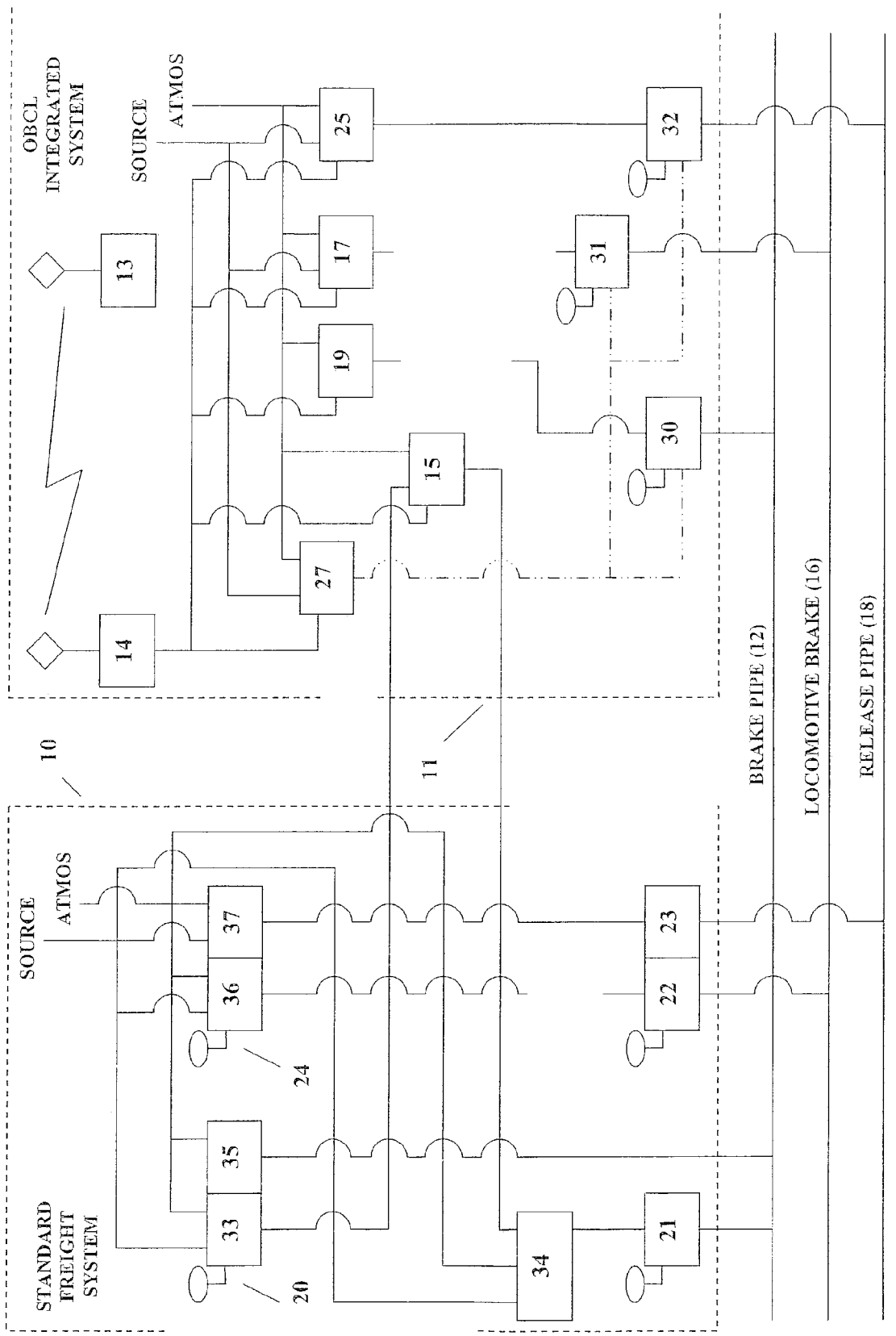
FIG. 1B – PRIOR ART

US 6,964,456 B2

BRAKE SYSTEM CUT-OUT CONTROL

BACKGROUND AND SUMMARY OF THE INVENTION

The present invention relates generally to a locomotive brake system and more specifically to an off board controlled locomotive (OBCL) system.

An off board controlled locomotive (OBCL) system usually includes a remote control transmitter (RCT) carried by an operator. In the industry, these are known as "belt packs." Alternatively, there may be a console in the yard or a tower. The OBCL systems are used to move a locomotive and the cars over a very short distance at a very low speed. It usually allows a remote operator not on the train to operate the system. The OBCL systems control the propulsion and braking of the locomotives.

Another form of off board control of locomotives is communicating from a lead locomotive to remote trailing locomotives distributed throughout the train. The operator at the control of the lead mode locomotive sets the propulsion and braking at the lead locomotive, and appropriate signals are sent to the remote locomotives that execute the required braking or propulsion. This may be the same braking or propulsion setting, or it may be a customized setting depending upon the location of the remote locomotive within the train. In this group of control over remote locomotives, the actual primary locomotive brake system is that which is being controlled. It controls not only the brake of the locomotive but may also operate on the brake pipe, which runs throughout the train.

Historically, OBCL systems have used either an integrated or a parallel control of the propulsion and brakes on the locomotive. The integrated control utilizes the standard locomotive control system. The parallel brake system does not rely on the standard locomotive control system and is connected in parallel to the standard system. Each is responsive to a portable remote control transmitter (RCT) or belt pack that requires appropriate interlocks and safety measures since there is not an operator on the locomotive or train.

The present locomotive brake system has at least one of a train brake pipe controller connected to a train brake pipe by a cut-out device, locomotive brake pipe controller connected to a locomotive brake pipe by a cut-out device, and a release pipe controller connected to a release pipe by a cut-out device. The cut-out devices include a pneumatic controller cut-out having an input connected to a respective controller and an output connected to a respective pipe and being responsive to pressure at the input to connect or disconnect the respective controller and the respective pipe. A system cut-out device selectively connecting a pressure source or atmosphere to the controller to assure the controller cut-out disconnects.

The present OBCL system includes a brake system having at least one of a train brake pipe controller connected to a train brake pipe by a cut-out device, locomotive brake pipe controller connected to a locomotive brake pipe by a cut-out device, and a release pipe controller connected to a release pipe by a cut-out device. The cut-out devices are a pneumatic controller cut-out having an input connected to a respective controller and an output connected to a respective pipe and being responsive to pressure at the input to connect or disconnect the respective controller and the respective pipe.

The present locomotive controller of a locomotive brake system includes an electro-pneumatic valve having a first input port connected to a first source of pressure by a system cut-out device, an atmosphere input port and an output port. A first piloted valve has a control port connected to the system cut-out device, a first input port connected to the output port of the electro-pneumatic valve, a second input port connected to a second source of pressure and an output port. A second piloted valve has a control port connected to the output of the first piloted valve, a source input, an atmosphere input and an output port. A pneumatic controller cut-out has an input connected to the output of the second piloted valve, an output connected to a locomotive brake pipe and being responsive to pressure at the input of the controller cut-out to connect or disconnect the controller and the locomotive brake pipe.

The present locomotive brake system has an electro-pneumatic train brake pipe controller connected to a train brake pipe by a cut-out device, an electro-pneumatic locomotive brake pipe controller connected to a locomotive brake pipe by a cut-out device, and an electro-pneumatic release pipe controller connected to a release pipe by a cut-out device. The train brake pipe controller provides an apply pressure signal to the respective cut-out device for train brake apply, system cut-out and controller failure. The locomotive brake pipe controller provides apply pressure signals to the respective cut-out device for locomotive brake apply, system cut-out and controller failure. The release pipe controller provides, to the respective cut-off device, a non-release pressure signal for system cut-out and controller failure and a release pressure signal for locomotive brake bail off. The cut-out device includes a pneumatic controller cut-out having an input connected to a respective controller and an output connected to a respective pipe and being responsive to pressure at the input to connect or disconnect the respective controller and the respective pipe to assure the application of the train and locomotive brakes for system cut-out and respective brake for a controller failure.

The OBCL system may be connected in parallel or integrated to a second or primary locomotive system. The second locomotive system controls the train brake and propulsion systems in response to onboard commands in a lead mode of the second locomotive system.

These and other aspects of the present invention will become apparent from the following detailed description of the invention, when considered in conjunction with accompanying drawings.

BRIEF DESCRIPTION OF THE DRAWINGS

FIG. 1A is a block diagram of a locomotive control system including an off board controlled locomotive computer system that is parallel with a standard locomotive control system, according to the prior art.

FIG. 1B is a block diagram of a locomotive control system including an off board controlled locomotive computer system that is integrated with a standard locomotive control system, according to the prior art.

DETAILED DESCRIPTION OF THE PREFERRED EMBODIMENTS

Figure 2:
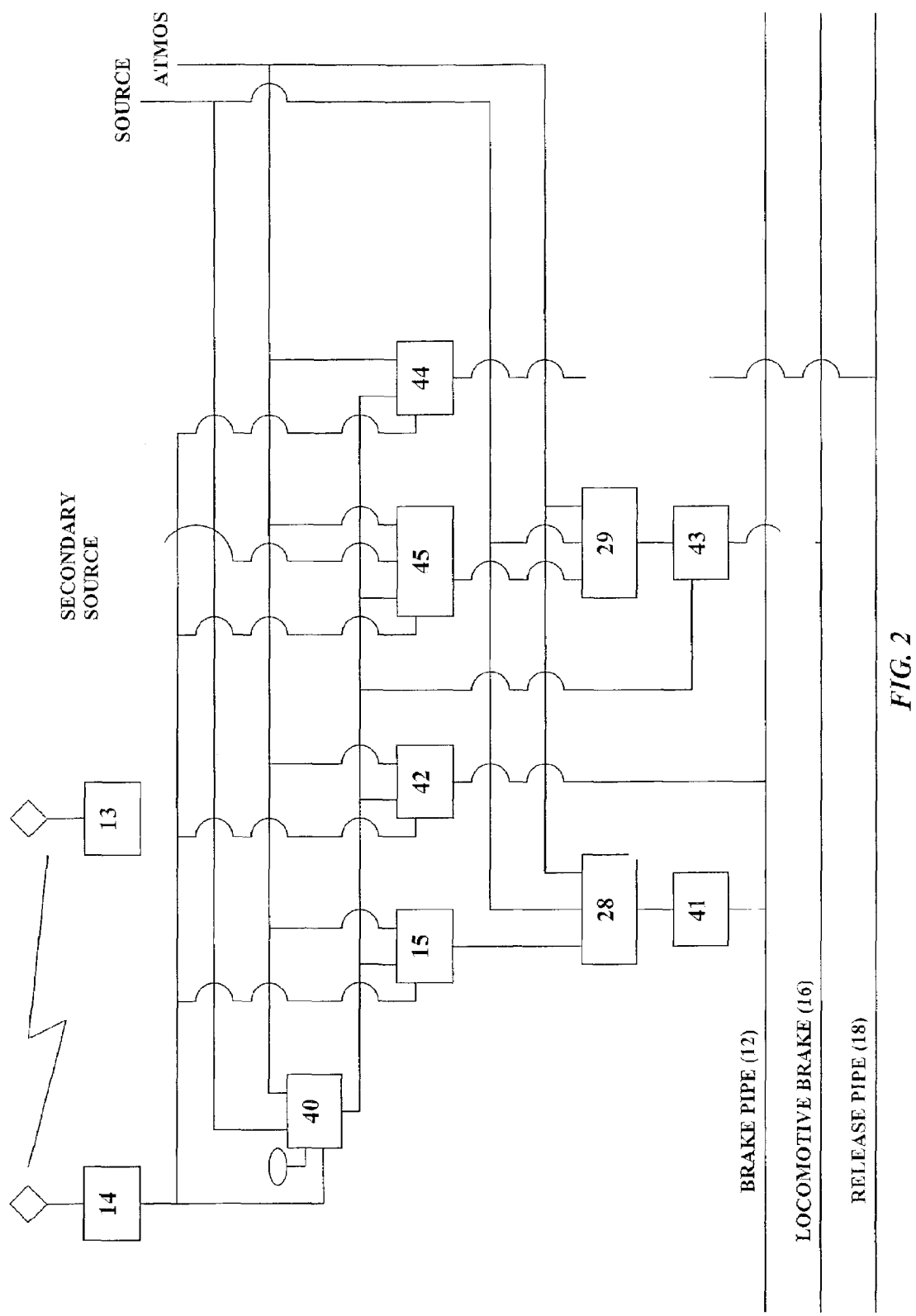
FIG. 2 is a schematic diagram of the off board controlled locomotive brake control portion incorporating the principles of the present invention.

FIG. 1A illustrates a locomotive including a train brake pipe 12, locomotive brake pipe 16 and release pipe 18. The locomotive brake pipe 16 is also known as the independent application and release pipe or the 20-pipe. The release pipe 18 is also know as the actuation pipe or the 13-pipe. This is the bail-off feature common in the industry. The locomotive brake pipe 16 and the release pipe 18 run through adjacent locomotives and provide locomotive only brake control. The train brake pipe 12 runs through the locomotives and cars and provides both locomotive and car brake control. The standard freight brake system 10 includes an automatic brake controller 20 for brake pipe 12 and an independent locomotive brake controller 24 for locomotive brake 16 and release pipe 18. The brake pipe cut-out 21 is the cut off control for brake pipe 12. A common cut-out control for locomotive pipe cut-out 22 and release pipe cut-out 23 cuts off both the locomotive brake 16 and release pipe 18.

In the standard freight brake system 10, the brake pipe 12 is controlled manually by an operator through the train or automatic brake controller 20, brake pipe module 33, brake pipe relay 34, emergency module 35 and the brake pipe cut-out 21. The locomotive brake pipe 16 and release pipe 18 are controlled manually by an operator through the independent locomotive brake controller 24, locomotive brake module 36, release module 37 and locomotive and release pipe cut-outs 22 and 23, respectively. This operation is known and widely accepted in the industry.

The OBCL parallel system 11 illustrated includes a remote control transmitter (RCT) 13 that is in communication with the locomotive controller 14 that receives the remote control signals from the RCT. The locomotive controller 14 provides the electrical control signals to the electro-pneumatic brake pipe module 15, the electro-pneumatic locomotive brake module 17, the electro-pneumatic emergency valve 19 and the electro-pneumatic release module 25. The locomotive controller 14 provides the electrical control signals to the brake pipe cut-out 26, locomotive brake pipe cut-out 31 and release pipe cut-out 32 as a variation to manual operation, as shown by the phantom line. The locomotive controller 14 has also controlled the manual cut-outs 26, 31 and 32 using a system cut-out 27, which includes pneumatic drivers.

The electro-pneumatic brake pipe module 15 connects the control port of the pneumatic brake pipe relay 28 to source pressure or atmosphere in response to the electrical signals from the locomotive controller 14. The pneumatic brake pipe relay 28 connects the brake pipe 12 to source or atmosphere in response to the control pressure from the electro-pneumatic brake pipe module 15. In this manner, the brake pipe 12 pressure is decreased or increased to apply or release the brakes on the train. The brake pipe cut-out 26 responds to a manual input, mechanical input from system cut-out 27 or electrical signals from the locomotive controller 14 to disconnect the pneumatic brake pipe relay 28 from the brake pipe 12.

The electro-pneumatic locomotive brake module 17 connects the control port of the pneumatic locomotive brake relay 29 to source pressure or atmosphere in response to the electrical signals from the locomotive controller 14. The pneumatic locomotive brake relay 29 connects the locomotive brake pipe 16 to source or atmosphere in response to the control pressure from the electro-pneumatic locomotive brake module 17. In this manner, the locomotive brake pipe 16 pressure is decreased or increased to apply or release the locomotives brake. The locomotive brake cut-out 31 responds to a manual input, mechanical input from system cut-out 27 or electrical signals from the locomotive controller 14 to disconnect the pneumatic locomotive brake relay 29 from the locomotive brake pipe 16.

The electro-pneumatic release module 25 connects the release pipe 18 to source pressure or atmosphere in response to the electrical signals from the locomotive controller 14. In this manner, the release pipe 18 is increased to source or decreased to atmosphere to effect the release or application of locomotives brake developed in response to brake pipe 12. The release cut-out 32 responds to a manual input, mechanical input from system cut-out 27 or electrical signals from the locomotive controller 14 to disconnect the electro-pneumatic release module 25 from the release pipe 18.

The electro-pneumatic emergency module 19 connects the brake pipe 12 to atmosphere in response to the electrical signals from the locomotive controller 14. In this manner, the brake pipe 12 is reduced to atmosphere very quickly to effect the application of train brakes in a very fast, effective manner. This is known in the industry as emergency brake initiation. The brake pipe cut-out 26 responds to a manual input, mechanical input from system cut-out 27 or electrical signals from the locomotive controller 14 to disconnect the electro-pneumatic emergency module 19 from brake pipe 12.

One standard freight system of the prior art (not shown) has brake pipe cut-out 21 and release brake cut-out 23 responsive to their input pressures to initially connect and subsequently disconnect the corresponding pipe.

FIG. 1A is representative of a typical control application of an OBCL parallel system, as is applied and known in the industry. The methods of electro-pneumatic module control and the dispersion of the locomotive controller may vary widely. The description is to set the methodology of controls for the purpose of clarification for this application and is not intended to describe any specific application. This present invention is that methodology related to the operation and functions of cut-out devices and system in the OBCL system 11, which will become apparent from the detailed description of the invention.

FIG. 1B illustrates a locomotive including brake pipe 12, locomotive brake pipe 16 and release pipe 18. The standard freight brake system 10 includes an automatic brake controller 20 for brake pipe 12, an independent locomotive brake controller 24 for locomotive brake 16 and release pipe 18. The brake pipe cut-off 21 is the cut off control for brake pipe 16. A common cut-out control for locomotive cut-out 22 and release cut-out 23 cuts off for both the locomotive brake 16 and release pipe 18.

In the standard freight brake system 10, the brake pipe 12 is controlled manually by an operator through the brake controller 20, brake pipe module 33, emergency module 35, brake pipe relay 34 and the brake pipe cut-out 21. The locomotive brake pipe 16 and release pipe 18 are controlled manually by an operator through the independent locomotive brake controller 24, locomotive brake module 36, release module 37 and locomotive and release cut-outs 22 and 23, respectively. This operation is known and widely accepted in the industry.

The OBCL integrated system 11 illustrated includes a remote control transmitter (RCT) 13 that is in communication with the locomotive controller 14 that receives remote control signals from the RCT. The locomotive controller 14 provides the electrical control signals to the electro-pneumatic brake pipe module 15, the electro-pneumatic locomotive brake module 17, the electro-pneumatic emergency valve 19 and the electro-pneumatic release module 25. As in the brake system 10, locomotive brake cut-out 31 and release pipe cut-out 32 have a common control. The locomotive controller 14 may provide the electrical control signals to the emergency cut out 30, locomotive brake cut out 31 and/or the release pipe cut out 32 as a variation to manual operation.

The source of the electro-pneumatic brake pipe module 15 is from the manual brake pipe module 33 of the brake controller 20 as integral to the standard freight system 10. The electro-pneumatic brake pipe module 15 is connected to the control port of the pneumatic brake pipe relay 34, as integral to the standard freight system 10, and provides source pressure from the brake pipe module 33 or atmosphere in response to the electrical signals from the locomotive controller 14. The pneumatic brake pipe relay 34 connects the brake pipe 12 to source or atmosphere in response to the source from the electro-pneumatic brake pipe module 15. The brake pipe cut-out 21, as integral to the standard freight system 10, responds to a manual input to disconnect the pneumatic brake pipe relay 34 from the brake pipe 12. The brake pipe cut-out 21, as integral to devices within the standard freight system 10, also responds to pilot pressure from such devices to disconnect the brake pipe 12. These devices, not illustrated, are a common industry application and are safety interlocks to assure train brake applications.

The operation and control of each of the locomotive brake 16, release pipe 18 and the electro-pneumatic emergency module 19 is the same in FIGS. 1A and 1B. FIG. 1B is representative of a typical control application of an OBCL integrated system, as is applied and known in the industry. The methods of electro-pneumatic module control and the dispersion of the locomotive controller may vary widely. The description is to set the methodology of controls for the purpose of clarification for this application and is not intended to describe any specific application. This present invention is that methodology related to the operation and functions of the cut-out devices and system in the OBCL system 11, which will become apparent from the detailed description of the invention.

FIGS. 1A and 1B illustrate typical methodologies or prior art for the cut-off of brake pipe 12, locomotive brake pipe 16 and release pipe 18 for OBCL systems. The two methods employed are either restrictive in manual or mechanical operations that require multiple operation, require large capacity, complex, cumbersome cut-out devices or have inherent failure conditions that are not desired in operation, particularly since there is not an operator on the locomotive or train. The present invention is the system application of devices to provide for a single point, safe cut out for each circuit that may either be manual in control or respond to electrical signals from the locomotive controller 14 of the OBCL system 11.

FIG. 2 shows the OBCL parallel system 11 of that in FIG. 1A illustrating the fundamental principle of this invention. Although not shown in the OBCL integrated system 11 of FIG. 1B, the illustration is representative and may be used in the integrated system. It includes a system cut-out 40. The system cut-out 40, as illustrated, responds to electrical signals from the locomotive controller 14. However, the system cut-out 40 may be manual or both. The system cut-out 40 responds to the momentary activation, either electrical signals from the locomotive controller 14 or manual operation, to connect and retain its output source to either the input source or atmosphere until activated otherwise.

The electro-pneumatic brake pipe module 15 connects the control port of the pneumatic brake pipe relay 28 to the system cut-out 40's source or atmosphere. With the system cut-out 40 being connected to atmosphere, the electro-pneumatic brake pipe module 15 source is also atmosphere. The pneumatic brake pipe relay 28 connects the brake pipe 12 to source or atmosphere in response to the control pressure from the electro-pneumatic brake pipe module 15. The system cut-out 40 being connected to atmosphere results in the decrease of pressure within brake pipe 12 and the resulting application of brakes on the train. A pneumatic brake pipe cut-out 41 responds to pressure at the output of the brake pipe relay 28 to initially disconnect and subsequently connect the output of the brake pipe relay 28 to the brake pipe 12.

The electro-pneumatic locomotive brake module 45 connects the control port of the pneumatic locomotive brake relay 29 to the system cut-out 40, secondary source or atmosphere. With the system cut-out 40 being connected to atmosphere, the electro-pneumatic locomotive brake module 45 connects its output to the secondary source. The pneumatic locomotive brake relay 29 connects the locomotive brake pipe 16 to source or atmosphere in response to the control pressure from the electro-pneumatic locomotive brake module 45. The locomotive brake cut-off 43 responds to pressure from the system cut-out 40 to connect the locomotive brake relay 29 to locomotive brake pipe 16. The locomotive brake cut-out 43 responds to atmosphere from the system cut-out 40 to connect the output of the locomotive brake relay 29 to locomotive brake pipe 16 only if the output of the locomotive brake relay 29 is at a source pressure. It does not allow atmosphere connection of locomotive brake relay 29 to locomotive brake pipe 16 when the output of the system cut-out 40 is at atmosphere. This allows locomotive brake pipe 16 pressure to respond to a secondary source outside of the OBCL system 11.

The electro-pneumatic emergency module 42 connects the brake pipe 12 to atmosphere in response to electrical signals from the locomotive controller 14. An emergency cut-out function of the electro-pneumatic emergency module 42 responds to the source pressure of the system cut-out 40 to connect atmosphere to brake pipe 12 when emergency module 42 is deactivated. The emergency cut-out function responds to atmosphere of the system cut-out 40 to disconnect the brake pipe 12 from atmosphere when emergency module 42 is deactivated.

The electro-pneumatic release module 44 connects the release pipe 18 to source or atmosphere in response to electrical signals from the locomotive controller 14. The release cut-out function of the electro-pneumatic release module 44 responds to the source pressure of the system cut-out 40 to connect the electro-pneumatic release module 44 to release pipe 18 when the release module is activated. The release cut-out function responds to atmosphere from the system cut-out 40 to disconnect the electro-pneumatic release module 44 from the release pipe 18 when the release module is activated.

FIGS. 3 through 6 show the functional relationships of the elements of the invention illustrated in FIG. 2.

Figure 3:
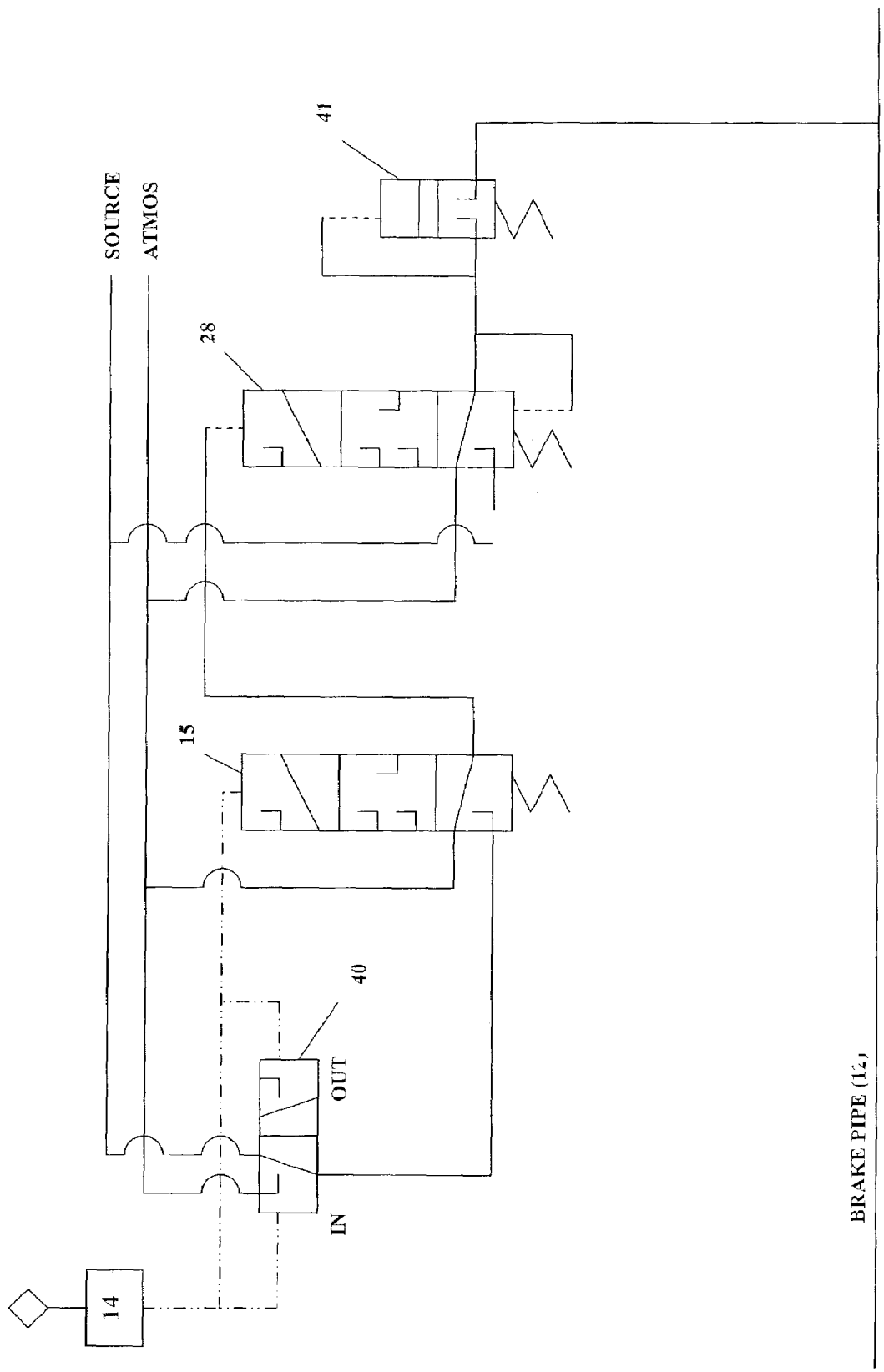
FIG. 3 is a schematic of the brake pipe control portion of FIG. 2, according to the principles of the present invention.

FIG. 3 illustrates the operating elements 40, 15, 28 and 41 of FIG. 2 of the invention for the modulation of brake pipe 12.

The system cut-out 40 is a typical two-position valve. The system cut-out valve 40, as illustrated, responds to electrical signals from the locomotive controller 14. However, the system cut-out valve 40 may be manual or both manual and electrical. The function of the system cut-out valve 40 controls the locomotive by the OBCL system 11 in the in-mode, and the OBCL system 11 does not control in the out-mode. The system cut-out valve 40 responds to the momentary activation to connect and retain its output connected to either the input source or atmosphere until activated to the other position or mode. In this manner, once placed to a mode or position of in or out, the mode or position will be maintained until selectively commanded to change to the opposite mode or position. This operation of the system cut-out valve 40 is integral to the operation of the other's cut-outs and the system interlocks that form the basis of this invention for each element depicted in FIGS. 3 through 6.

In the in-mode operation of the system cut-out valve 40, the locomotive source pressure is supplied to the electro-pneumatic brake pipe module 15, as shown in FIG. 3. The typical pressure controller 15 illustrated is to represent various methods of electro-pneumatic controllers available in market. The pressure controller 15 responds to electrical signals from the locomotive controller 14 to connect the pilot line of relay valve 28 either to source or atmosphere or to disconnect from both. The function of the pressure controller 15 is to modulate the pilot pressure between source pressure and atmosphere variably on command of the OBCL control. The pressure controller 15 connects the pilot line to atmosphere on loss of signal from the locomotive controller 14. This interlock is known as default to train brake apply condition. One function of the system cut-out valve 40 in the out-mode is the connection of the pressure controller's 15 source to atmosphere. This assures that, when placed to the out-mode, the pilot out of the pressure controller 15 will be connected to atmosphere via the source port of the pressure controller 15 and atmosphere connection of the system cut-out valve 40.

The pilot out of the pressure controller 15 is connected to the pilot or control port of the brake pipe relay valve 28. A typical relay valve 28 is illustrated. The relay valve 28 responds to the modulated pressure of the pilot to connect source from a source input or atmosphere from an atmosphere input to, or to disconnect both from, brake pipe 12. The function of the relay valve 28 is to increase the capacity over that of the pressure controller 15. The relay valve 28 is not required if the capacity of the pressure controller 15 is sufficient to control the train brake pipe 12. However, if used as illustrated, it is important that the default condition of the relay valve 28 is to connect its output to atmosphere when the pilot is connected to atmosphere.

The brake pipe cut-out 41 is unique in this application in that its pilot is taken from the output of the relay valve 28. The brake pipe cut-out 41 is a two-position valve, either to connect or disconnect the relay valve output to brake pipe 12. The brake pipe cut-out 41 will disconnect on low pressure source from the brake pipe relay 28. Also, the cut-out 41 will remain in the disconnect position even with pressure in the brake pipe 12, particularly when supplied from a secondary source, to recharge the brake pipe 12.

The invention is the combination of valves such that when the system cut-out valve 40 is placed to the out-mode, it will assure that the pilot that the pressure controller 15 is connected to atmosphere, resulting in the output of the relay valve 28 to be connected to atmosphere. This reduces the brake pipe 12 to atmosphere and the subsequent disconnect of the brake pipe relay 28 by the brake pipe cut-out 41 due to this reduction of pressure within the brake pipe 12 and the output of the relay valve 28. This assures the reduction of brake pipe 12, resulting in the application of train braking. Then and only then does it provide the disconnect, thereby allowing the release of train braking by charging the brake pipe 12 from a secondary source. The placement of the system cut-out valve 40 to the out-mode manually or electrically will override any signal provided to pressure controller 15 from the locomotive controller 14 to assure the reduction of brake pipe 12 and subsequent cut off of the relay valve 28.

Figure 4:
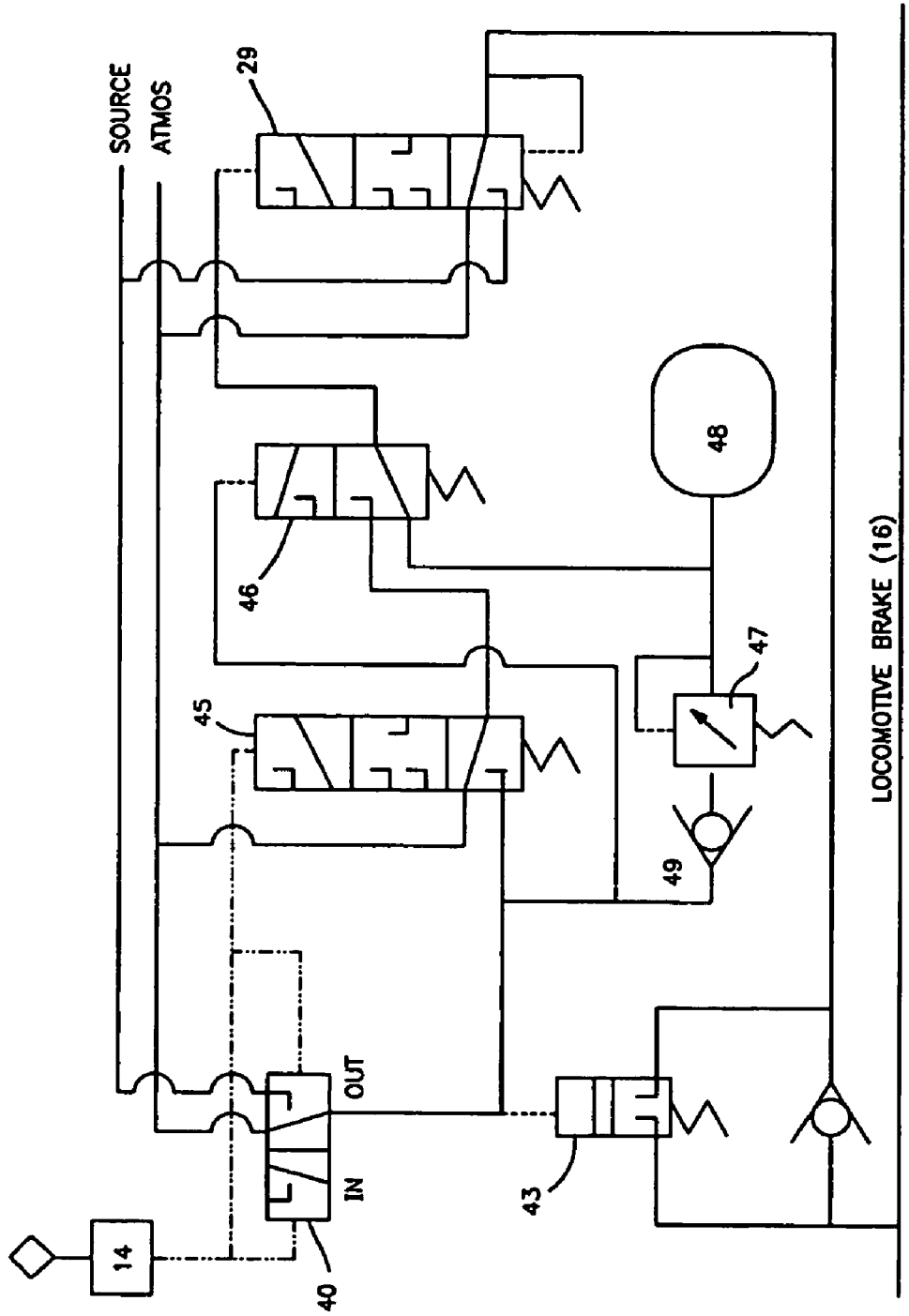
FIG. 4 is a schematic diagram of the locomotive brake or 20-pipe control portion of FIG. 2 incorporating the principles of the present invention.

FIG. 4 illustrates the operating elements 40, 45, 29 and 43 of FIG. 2 of the invention for the modulation of locomotive brake pipe 16.

The system cut-out 40 is a typical two-position valve and functions explicitly as described for brake pipe element of FIG. 3.

In the in-mode operation of the system cut-out valve 40, the locomotive source pressure is supplied to a typical pressure controller 45 illustrated to represent various methods of electro-pneumatic controllers available in market. The pressure controller 45 responds to electrical signals from the locomotive controller 14 to connect the pilot line either to source or atmosphere or to disconnect from both. The function of the pressure controller 45 is to modulate the pilot pressure between source pressure and atmosphere variably on command of the OBCL control.

The pilot line of the pressure controller 45 is connected to the pilot or control port of the locomotive brake relay valve 29 by three-way pilot valve 46. Relay valve 29 is illustrated as a typical relay valve. The relay valve 29 responds to the modulated pressure of the pilot to connect source from a source input or atmosphere from an atmosphere input to, or to disconnect both from, the locomotive brake pipe 16. The function of the relay valve 29 is to increase the capacity over that of the pressure controller 45 and reducing valve 47. The relay valve 29 can be omitted if the capacity is sufficient to control the locomotive brake pipe 16.

A locomotive brake cut-out 43 includes a combined two-position pilot valve portion and a check valve in effect in parallel to the pilot valve portion. The two-position valve 43 is controlled by the system cut-out valve 40. The two-position valve 43 cuts off the pressure from the relay valve 29 and the locomotive brake pipe 16 for the out-mode of the system cut-out valve 40 and connects the relay valve 29 and the locomotive brake pipe 16 for the in-mode of the system cut-out valve 40. The check valve of locomotive brake cut-out 43 connects locomotive source, but not atmosphere, from the output of relay valve 29 to the locomotive brake pipe 16 when the locomotive brake cut-out valve 43 is in its disconnect position. As will be explained below, this allows applying of the locomotive brake in combination with pilot valve 46 and secondary source 48 when the system cut-out valve 40 is in the out-mode and subsequently cutting off the relay valve 29 from the locomotive brake pipe 16.

A typical three-way pilot 46 connects the pilot line of the pressure controller 45 or a secondary source 48 and a typical reducing valve 47 to the control port of the relay valve 29. The three-way pilot 46 responds to the in-mode of the system cut-out valve 40 to connect the pressure controller 45 to the control port of relay valve 29 for normal OBCL control. The three-way pilot 46 responds to the out-mode of the system cut-out valve 40 to connect the reducing valve 47 output and secondary source 48 to the control port of the relay valve 29. The secondary source 48 is charged from the locomotive source via system cut-out valve 40, check valve 49 and reducing valve 47.

Operation of the system for control of locomotive brake pipe 16 is fully under the control of the OBCL system through the pressure controller 45 with the system cut-out valve 40 placed to the in-mode of operation. Modulation of the pressure within the locomotive brake pipe 16 results in the application or release of braking on the locomotives.

The invention is the combination of valves such that when the system cut-out valve 40 is placed to the out-mode, it will assure the pressure within the locomotive brake pipe 16 is at a level as set by the reducing valve 47. This results in the application of braking on the locomotives, then subsequently allows full modulation control of the locomotive brake pipe 16 from another secondary source. The placement of the system cut-out valve 40 to its out-mode manually or electrically will override any signal provided to pressure controller 45 from the locomotive controller 14 to assure the application of locomotive braking and subsequent cut off.

Figure 5:
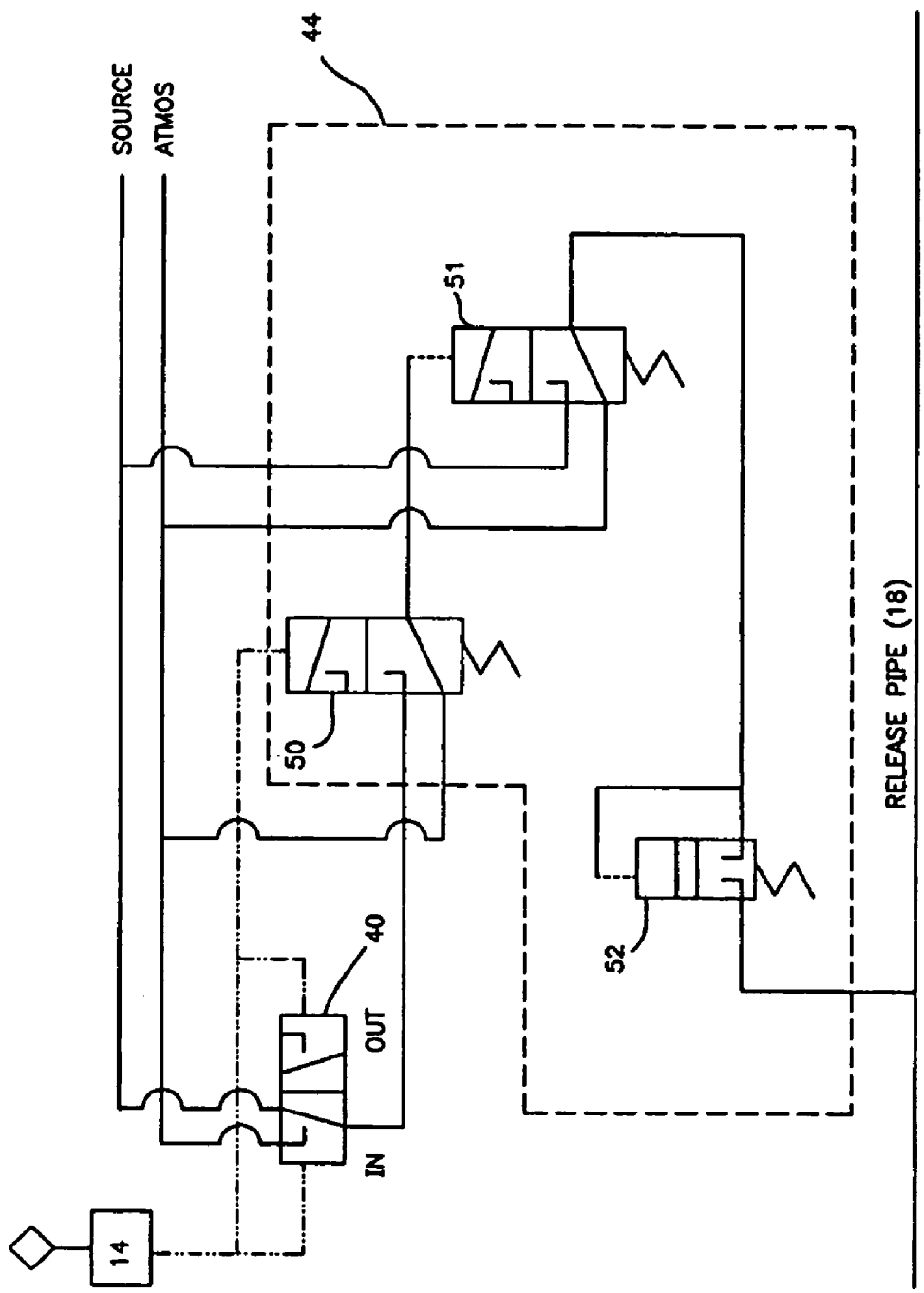
FIG. 5 is a schematic of the locomotive release or 13-pipe control portion of FIG. 2 incorporating the principles of the present invention.

FIG. 5 illustrates the operating elements 40 and 44 of FIG. 2 of the invention for the modulation of release pipe 18. Operating element or module 44 is further illustrated in FIG. 5 comprising operating elements 50, 51 and 52.

The system cut-out 40 is a typical two-position valve and functions explicitly as described for brake pipe element of FIG. 3.

In the in-mode operation of the system cut-out valve 40, the locomotive source pressure is supplied to a release pipe controller shown as a typical three-way electropneumatic valve 50. The three-way electropneumatic valve 50 responds to electrical signals from the locomotive controller 14 to connect the control port of the three-way pilot valve 51 either to source or atmosphere. The typical three-way pilot valve 51 responds to connect source, from a source input or atmosphere, from an atmosphere input to release pipe 18. The function of the three-way pilot valve 51 is to increase the capacity over that of the three-way electropneumatic valve 50 and/or provide its source pressure from other than the locomotive source, for example, brake pipe 12. The three-way pilot valve 51 may be eliminated if sufficient capacity is available to control release pipe 18.

A release cut-out 52 is a two-position valve, which either connects or disconnects its input to or from release pipe 18. The release cut-out 52 will disconnect on low pressure source from the three-way pilot valve 51. The release cut-out valve 52 will remain in the disconnect position even with pressure in the release pipe 18, particularly when supplied from a secondary source.

The present invention is the combination of valves such that when the system cut-out valve 40 is placed to the out-mode, it will assure the output pressure of the three-way electropneumatic valve 50 is connected to atmosphere whether activated or not. This results in the output of the three-way pilot valve 51 to connect to atmosphere, resulting in the reduction of release pipe 18 to atmosphere. Subsequently, the three-way pilot valve 51 is disconnected from release pipe 18 by the release cut-out 52 due to this reduction of pressure in the release pipe 18. This assures the reduction of release pipe 18, which allows the application of locomotive braking in response to brake pipe modulation, and subsequently allows the modulation of release pipe 18 pressure from a secondary source to release the locomotive brakes. That placement of the system cut-out valve 40 to the out-mode will override any signal provided to electrical valve 50 from the locomotive controller 14 to assure the reduction of release pipe 18 and subsequent cut off.

Figure 6:
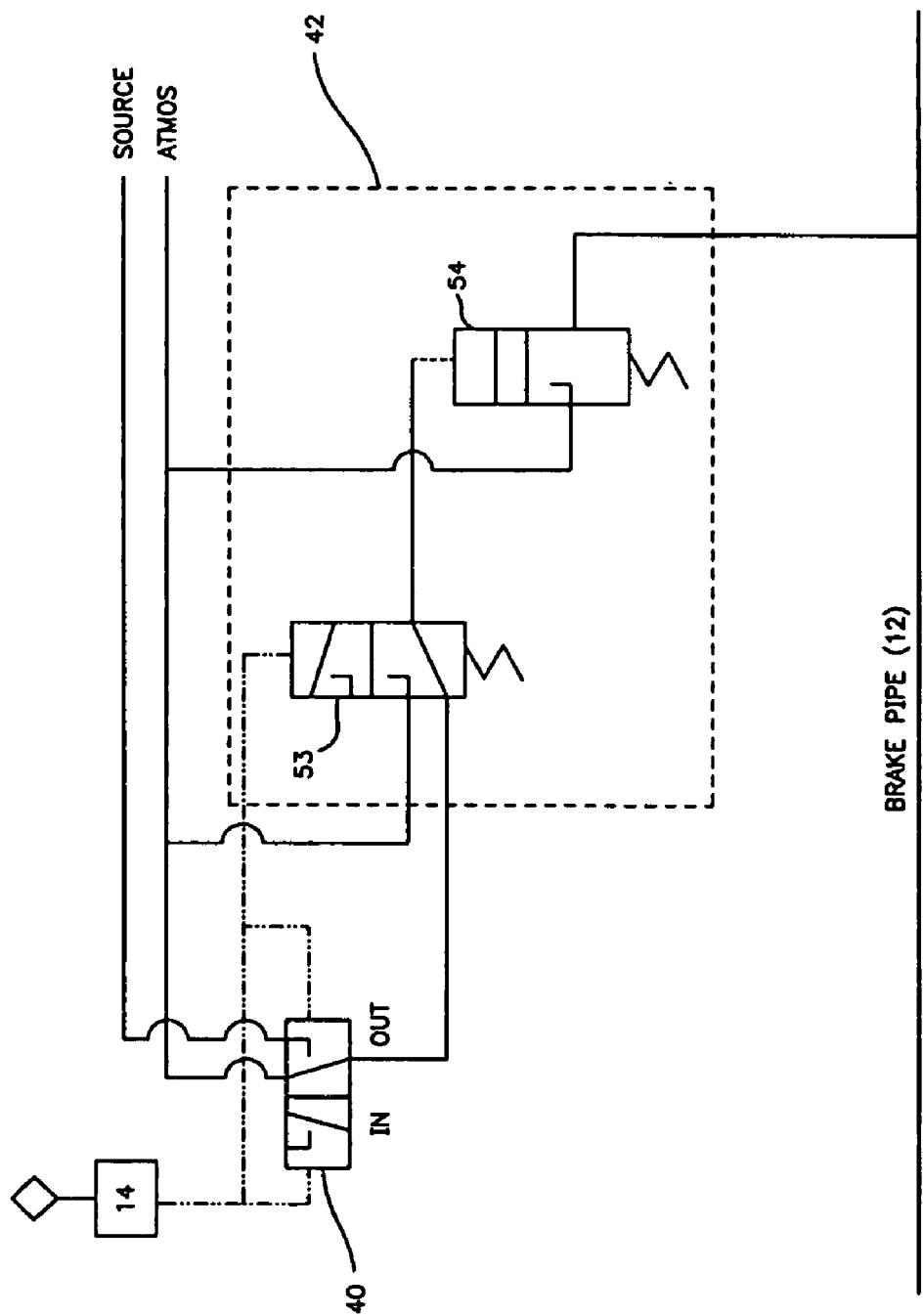
FIG. 6 is a schematic diagram of an emergency portion of FIG. 2, according to the principles of the present invention.

FIG. 6 illustrates the operating elements 40 and 42 of FIG. 2 of the invention for the emergency modulation of brake pipe 12. Operating element or module 42 is further illustrated in FIG. 6 comprising operating elements 53 and 54.

The system cut-out 40 is a typical two-position valve and functions explicitly as described for brake pipe element of FIG. 3.

In the in-mode operation of the system cut-out valve 40, the locomotive source pressure is supplied to an emergency controller shown as a typical three-way electropneumatic valve 53. The three-way electropneumatic valve 53 responds to electrical signals from the locomotive controller 14 to connect the control port of the two-way pilot valve 54 either to source or atmosphere. The typical two-way pilot valve 54 responds to source output of the three-way electropneumatic valve 53 to connect atmosphere to brake pipe 12. The function of the two-way pilot valve 54 is to reduce brake pipe 12 to atmosphere at a very high capacity to initiate rapid train braking known as an emergency brake application in the industry. The two-way pilot valve 54 responds to atmosphere output of the three-way electropneumatic valve 53 to disconnect brake pipe 12 from atmosphere. In this manner, the brake pipe 12 may be modulated, as described in FIG. 3.

In the out-mode operation of the system cut-out valve 40, the three-way electropneumatic 53 is connected to atmosphere, resulting in the two-way pilot 54 disconnecting the brake pipe 12 from atmosphere.

The required interlock for an OBCL system is such that loss of signal from the locomotive controller 14 to the three-way electropneumatic valve 53 initiates emergency braking. The typical method to accomplish this is to have the two-way pilot 54 connect brake pipe 12 to atmosphere when its input is atmosphere, then to disconnect brake pipe 12 from atmosphere when its control input is source as controlled by a three-way electropneumatic valve 53. The present system is the combination of valves such that when placed to the in-mode, system cut-out valve 40 utilizes the positive pressure of the locomotive source to initiate an emergency by the two-way pilot 54 when three-way valve 53 is deactivated under the control of locomotive controller 14 or by loss of signal. Emergency is then terminated by the system cut-out valve 40 being moved to the out-mode and removal of this source pressure from electropneumatic valve 53. Activation of three-way valve 53 by locomotive controller 14 will also terminate the emergency by providing atmosphere to pilot valve 54. The invention provides for the pilot control cut out of emergency initiation for subsequent brake pipe modulation control by a secondary source while maintaining the default feature of emergency application when the OBCL system operates.

Although FIGS. 2 through 6 have been described with respect to the parallel systems like those in FIG. 1A, the concepts are applicable to integrated systems, such as those of FIG. 1B. Also, the locomotive brake systems of FIGS. 1A and 1B are merely examples, and the present invention can be used with other locomotive brake control systems.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A locomotive brake system having at least one of a train brake pipe controller connected to a train brake pipe by a cut-out device, a locomotive brake pipe controller connected to a locomotive brake pipe by a cut-out device, and a release pipe controller connected to a release pipe by a cut-out device,
   wherein each cut-out device comprises a pneumatic controller cut-out having an input connected to a respective controller and an output corrected to a respective pipe and being responsive to changes in pneumatic pressure at the input to one of connect and disconnect the respective controller and the respective pipe; and
   including a system cut-out device connecting a pressure source to the input of each controller in an in-mode and connecting atmosphere to the input of each controller in an out-mode to assure each pneumatic controller cut-out disconnects when the system cut-out device is in the out-mode.

2. The system according to claim 1, wherein the controllers each include an electro-pneumatic valve having a first input port connected to the system cut-out device, an atmosphere input port and an output port connected to the respective pneumatic controller cut-out device.

3. The system according to claim 2, wherein the system cut-out device is a two-position valve which connects the pressure source to the controllers' first input port in an in-mode and connects the atmosphere to the controllers' first input ports in an out-mode.

4. The system according to claim 2, wherein the controllers each includes a first piloted valve having a control port connected to the output port of the respective electro-pneumatic valve and an output port connected to the input of the respective controller cut-out device.

5. The system according to claim 4, wherein the first piloted valves for the train brake pipe controller and the locomotive brake pipe controller are relay valves.

6. The system according to claim 4, wherein an input of the first piloted valve of the locomotive controller is connected to one of the source pressure of the system cut-out device or a secondary source of pressure.

7. The system according to claim 4, wherein the locomotive controller includes a second piloted valve having a control port connected to the system cut-out device, a first input port connected to the output port of the respective electro-pneumatic valve, a second input port connected to a second source of pressure and an output port connected to the control port of the respective first piloted valve.

8. The system according to claim 7, wherein the second source is a reservoir charged by the system cut-out device.

9. The system according to claim 7, wherein the second piloted valve selects the first input port for an in-mode of the system cut-out device and the second input port for an out-mode of the system cut-out device.

10. The system according to claim 1, wherein the system cut-out valve is one of manually, mechanically, pneumatically and electrically operated two position valve.

11. The system according to claim 1, wherein the brake system is part of one of an on board locomotive control system and an off board controlled locomotive system.

12. A remote controlled locomotive system including a receiver for receiving remote control signals from a remote control device, a locomotive controller on a locomotive for controlling brake and propulsion systems of a train including the locomotive in response to received remote control signals; wherein the brake system includes at least one of a train brake pipe controller connected to a train brake pipe by a cut-out device, a locomotive brake pipe controller connected to a locomotive brake pipe by a cut-out device, and a release pipe controller connected to a release pipe by a cut-out device; and wherein each cut-out device comprises:
   a pneumatic controller cut-out having an input connected to the respective controller and an output connected to the respective pipe and being responsive to changes in pneumatic pressure at the input to one of connect and disconnect the respective controller and the respective pipe;
   wherein the controllers are connected to a pressure source by a system cut-out device which connects a pressure source to the input of each controller in an in-mode and connects atmosphere to the input of each controller in an out-mode to assure each pneumatic controller cut-out disconnects when the system cut-out device is in the out-mode.

13. A locomotive controller of a locomotive brake system, the controller comprising:
   an electro-pneumatic valve having a first input port connected to a first source of pressure by a system cut-out device, an atmosphere input port and an output port;
   a first piloted valve having a control port connected to the system cut-out device, a first input port connected to the output port of the electro-pneumatic valve, a second input port connected to a second source of pressure and an output port;
   a second piloted valve having a control port connected to the output of the first piloted valve, a source input, an atmosphere input and an output port; and
   a pneumatic controller cut-out having an input connected to the output of the second piloted valve, an output connected to a locomotive brake pipe and being responsive to pressure at the input of the pneumatic controller cut-out to one of connect and disconnect the second piloted valve and the locomotive brake pipe.

14. The system according to claim 13, wherein the system cut-out device selectively connects the first pressure source in one of an in-mode and atmosphere to the electro-pneumatic valve in an out-mode to assure the pneumatic controller cut-out disconnects.

15. The system according to claim 13, wherein the second source is a reservoir charged by the system cut-out device.

16. The system according to claim 13, wherein the first piloted valve selects the first input port for the in-mode of the system cut-out device and the second input port for the out-mode of the system cut-out device.

17. A locomotive brake system having an electro-pneumatic train brake pipe controller connected to a train brake pipe by a cut-out device, an electro-pneumatic locomotive brake pipe controller connected to a locomotive brake pipe by a cut-out device, and an electro-pneumatic release pipe controller connected to a release pipe by a cut-out device, and a system cut-out device having an in-mode and an out-mode and being connected to each of the train brake pipe controller, locomotive brake pipe controller and electro-pneumatic release pipe controller, wherein
   the train brake pipe controller provides an apply pressure signal to the respective cut-out device for train brake apply when the system cut-out devices is in the out-mode and when the train brake pipe controller fails;
   the locomotive brake pipe controller provide apply pressure signals to the respective cut-out device for locomotive brake apply when the system cut-out device is in the out-mode and the locomotive brake pipe controller fails;

the release pipe controller provides to the respective cut-off device a non release pressure signal when the system cut-out device is in the out-mode and the release pipe controller fails and provides a release pressure signal for locomotive brake bail off; and each cut-out device comprises a pneumatic controller cut-out having an input connected to the respective controller and an output connected to the respective pipe and being responsive to pneumatic pressure at the input to one connect and disconnect the respective controller and the respective pipe to assure the application of the train and locomotive brakes when the system cut-out and device is in the out-mode and when the respective controller fails; and wherein said system cut-out device is a two-position valve which connects a pressure source to the controllers' first input ports in an in-mode and connects the atmosphere to the controllers' first input ports in an out-mode to assure application of the train and locomotive brakes in the out-mode.

18. A locomotive brake system comprising:

at least one of a train brake pipe controller connected to a train brake pipe by a cut-out device, a locomotive brake pipe controller connected to a locomotive brake pipe by a cut-out device, and a release pipe controller connected to a release pipe by a cut-out device;

wherein each cut-out device comprises a pneumatic controller cut-out having an input connected to a respective controller and an output connected to a respective pipe and being responsive to pressure at the input to one of connect and disconnect the respective controller and the respective pipe;

a system cut-out device connecting one of a pressure source and atmosphere to each controller to assure each pneumatic controller cut-out disconnects; and wherein the pneumatic controller cut-out device for the locomotive brake pipe controller includes a check valve moved to open by an in-mode of the system cut-out device and the check valve is open when pressure at an input side of the check valve is greater than pressure at an output side of the check valve.

19. A locomotive brake system comprising:

at least one of a train brake pipe controller connected to a train brake pipe by a cut-out device, a locomotive brake pipe controller connected to a locomotive brake pipe by a cut-out device, and a release pipe controller connected to a release pipe by a cut-out device;

wherein each cut-out device comprises a pneumatic controller cut-out having an input connected to a respective controller and an output connected to a respective pipe and being responsive to pressure at the input to one of connect and disconnect the respective controller and the respective pipe;

a system cut-out device connecting one of a pressure source and atmosphere to each controller to assure each pneumatic controller cut-out disconnects; and an emergency controller including an electro-pneumatic valve having a first input port connected to the system cut-out device, an atmosphere input port and an output port connected to a control input of a piloted valve which selectively connects the train brake pipe to atmosphere.

* * * * *

UNITED STATES PATENT AND TRADEMARK OFFICE
CERTIFICATE OF CORRECTION

PATENT NO. : 6,964,456 B2
APPLICATION NO. : 10/388533
DATED : November 15, 2005
INVENTOR(S) : Kevin B. Root It is certified that error appears in the above-identified patent and that said Letters Patent is hereby corrected as shown below:

In Claim 1, column 11, line 10, "corrected" should read --connected--.

In Claim 17, column 12, line 61, "devices" should read --device--; and column 13, line 2, "cut-off" should read --cut-out--.

Signed and Sealed this

Twentieth Day of November, 2007

JON W. DUDAS
*Director of the United States Patent and Trademark Office*